US008414302B2

(12) United States Patent  (10) Patent No.: US 8,414,302 B2
Chang  (45) Date of Patent: Apr. 9, 2013

(54) MODULAR EDUCATIONAL DEVICE (76) Inventor: Chih-Hao Chang, Chiayi (TW)

( * ) Notice: Subject to any disclaimer, the term of this patent is extended or adjusted under 35 U.S.C. 154(b) by 445 days.

(21) Appl. No.: 12/768,386

(22) Filed: Apr. 27, 2010

(65) Prior Publication Data

US 2011/0212425 A1 Sep. 1, 2011

(30) Foreign Application Priority Data

Mar. 1, 2010 (TW) .............................. 99203650 U (51) Int. Cl.
G09B 19/00 (2006.01)
(52) U.S. Cl. ....................................................... 434/258
(58) Field of Classification Search ................... 434/258
See application file for complete search history.

(56) References Cited

U.S. PATENT DOCUMENTS

| 3,805,411 | A | * | 4/1974 | Andrews, Jr. | ................. | 434/252 |
|-----------|---|---|--------|--------------|-----------------|---------|
| 4,538,394 | A | * | 9/1985 | Farnum | ............................ | 52/664 |
| 5,111,627 | A | * | 5/1992 | Brown | ......................... | 52/126.5 |
| 5,356,354 | A | * | 10/1994 | Owens | ............................. | 482/35 |
| 5,606,816 | A | * | 3/1997 | Schwartz | ....................... | 406/617 |
| 5,924,905 | A | * | 7/1999 | Cyrus et al. | .................... | 446/118 |
| 5,924,906 | A | * | 7/1999 | Grafton | ........................ | 446/121 |
| 5,928,288 | A | * | 7/1999 | Wilson | ........................ | 623/22.22 |
| 5,947,787 | A | * | 9/1999 | Cyrus et al. | .................... | 446/127 |
| 5,951,356 | A | * | 9/1999 | Cyrus et al. | .................... | 446/118 |
| 5,993,283 | A | * | 11/1999 | Cyrus et al. | .................... | 446/124 |
| 6,059,631 | A | * | 5/2000 | Maddock | ........................ | 446/127 |
| 6,079,984 | A | * | 6/2000 | Torres et al. | .................. | 434/247 |
| 6,129,605 | A | * | 10/2000 | Cyrus et al. | .................... | 446/118 |
| 6,166,623 | A | * | 12/2000 | Coward | ...................... | 340/384.1 |
| 6,264,199 | B1 | * | 7/2001 | Schaedel | ................... | 273/157 R |
| 6,282,849 | B1 | * | 9/2001 | Tuczek | ........................... | 52/81.1 |
| 6,537,077 | B1 | * | 3/2003 | Johnson | ....................... | 434/258 |
| 6,856,504 | B2 | * | 2/2005 | Zheng | ..................... | 361/679.23 |
| 7,031,147 | B2 | * | 4/2006 | Zheng | ..................... | 361/679.01 |
| 7,040,838 | B2 | * | 5/2006 | Allard et al. | .................... | 405/36 |
| 7,070,416 | B1 | * | 7/2006 | Lau | ............................... | 434/250 |
| 7,114,276 | B2 | * | 10/2006 | Scherba | .......................... | 40/610 |
| 7,169,094 | B2 | * | 1/2007 | Ardito, III | ..................... | 482/129 |
| 7,213,357 | B2 | * | 5/2007 | Scherba | .......................... | 40/610 |
| 7,288,056 | B1 | * | 10/2007 | Whiting | ........................ | 482/148 |
| 7,330,856 | B2 | * | 2/2008 | Nicastro et al. | ....................... | 1/1 |
| 7,365,967 | B2 | * | 4/2008 | Zheng | ..................... | 361/679.09 |
| 2005/0142385 | A1 | * | 6/2005 | Jin | .............................. | 428/694 T |
| 2006/0091606 | A1 | * | 5/2006 | Paugh et al. | .................. | 273/288 |
| 2008/0226427 | A1 | * | 9/2008 | Van Zile | ......................... | 414/14 |

* cited by examiner

Primary Examiner — Kurt Fernstrom
Assistant Examiner — Dolores Collins (57) ABSTRACT A modular educational device includes primary and secondary modular boundary segments each having an outer shell extending to terminate at two socket ends, a plurality of modular plug-ended connectors each having two plug ends configured to mate with the corresponding ones of primary and secondary socket ends so as to enable the primary and secondary outer shell to form a loop-shaped structure that encircles an enclosed space of a certain geometric shape, and a modular support stand having a base and a pair of jaws which extend uprightly from the base and which are spaced apart from each other by a fitting space for accommodating a gripped region of the primary modular boundary segment so as to enable the loop-shaped structure to be stood on a surface.

5 Claims, 7 Drawing Sheets

MODULAR EDUCATIONAL DEVICE

CROSS-REFERENCE TO RELATED APPLICATION

This application claims priority of Taiwanese Application No. 099203650, filed on Mar. 1, 2010, the disclosure of which is herein incorporated by reference.

BACKGROUND OF THE INVENTION

1. Field of the Invention

This invention relates to an educational device, more particularly to a modular educational device that includes modular segments that can be assembled and disassembled to form a geometric shape.

2. Description of the Related Art

Crawl-through geometric units are used to help young children develop mobility abilities and identify geometric shapes. However, since such geometric units are generally made of wood, their shapes and sizes are fixed. As such, storage of the conventional geometric units is also inconvenient.

SUMMARY OF THE INVENTION

An object of the present invention is to provide a modular educational device which includes a plurality of modular boundary segments that can be assembled and disassembled to form a geometric shape, which can be conveniently stored, and which can be used to help young children develop body awareness and movement abilities and learn geometric shapes.

According to this invention, the modular educational device is made of a flexible material, and includes a primary modular boundary segment, at least one secondary modular boundary segment, a plurality of modular plug-ended connectors, and a modular support stand. The primary modular boundary segment has a primary outer shell extending along a primary lengthwise line to terminate at two primary socket ends, and having a gripped region. The secondary modular boundary segment has a secondary outer shell extending along a secondary lengthwise line to terminate at two secondary socket ends. Each of the connectors has a shell body which has substantially the same dimension in cross-section as that of a respective one of the primary and secondary socket ends, and two plug ends which extend from the shell body, and which are configured to mate with corresponding ones of the primary and secondary socket ends, respectively, so as to permit the secondary outer shell to be coupled to the primary outer shell and to cooperate with the primary outer shell to form a loop-shaped structure that encircles an enclosed space facing in a transverse direction relative to the primary lengthwise line. The support stand has a base which extends longitudinally along a baseline and which further extends from the baseline in the transverse direction to terminate at front and rear ends, and a pair of jaws which are disposed at opposite sides of the baseline, and which extend from the base in an upright direction. The jaws are spaced apart from each other by a fitting space configured to permit the gripped region to be snugly fitted therein so as to enable the loop-shaped structure to be stood on a surface.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is described in greater detail, it should be noted that same reference numerals have been used to denote like elements throughout the specification.

Figure 1:
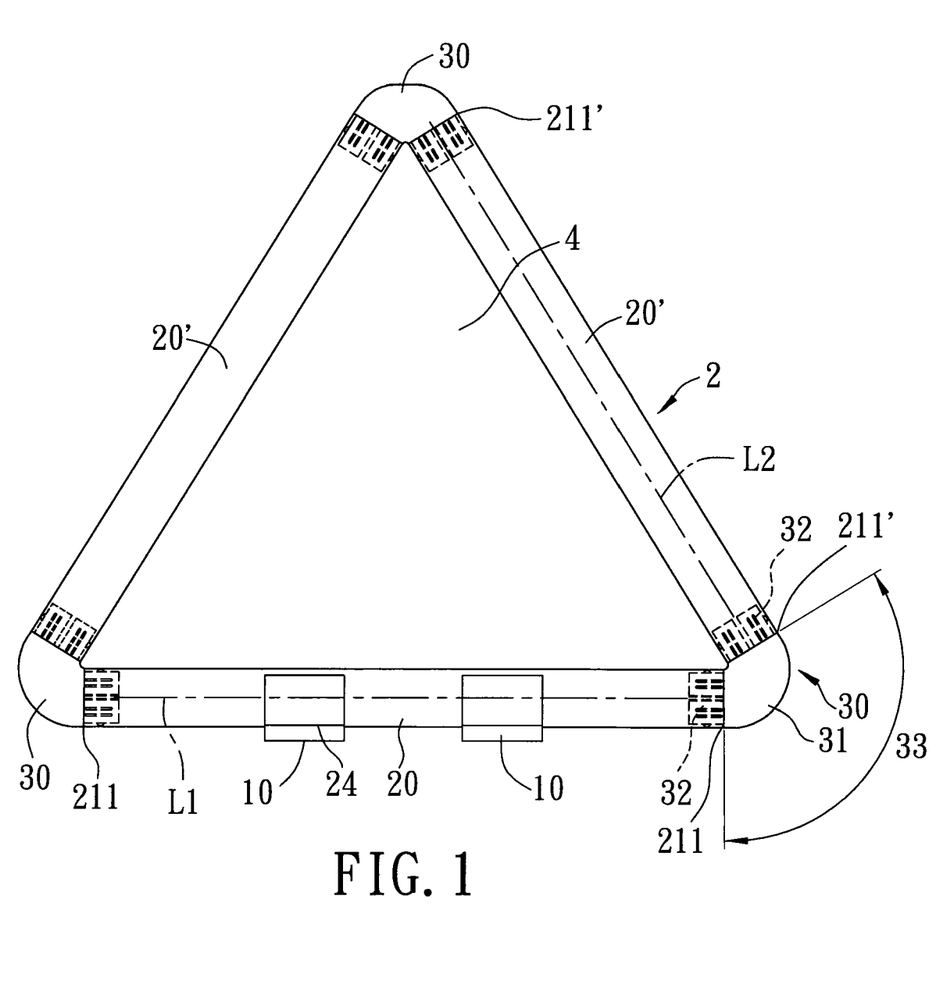
FIG. 1 is a schematic front view of the first preferred embodiment of a modular educational device according to this invention when assembled.
Figure 2:
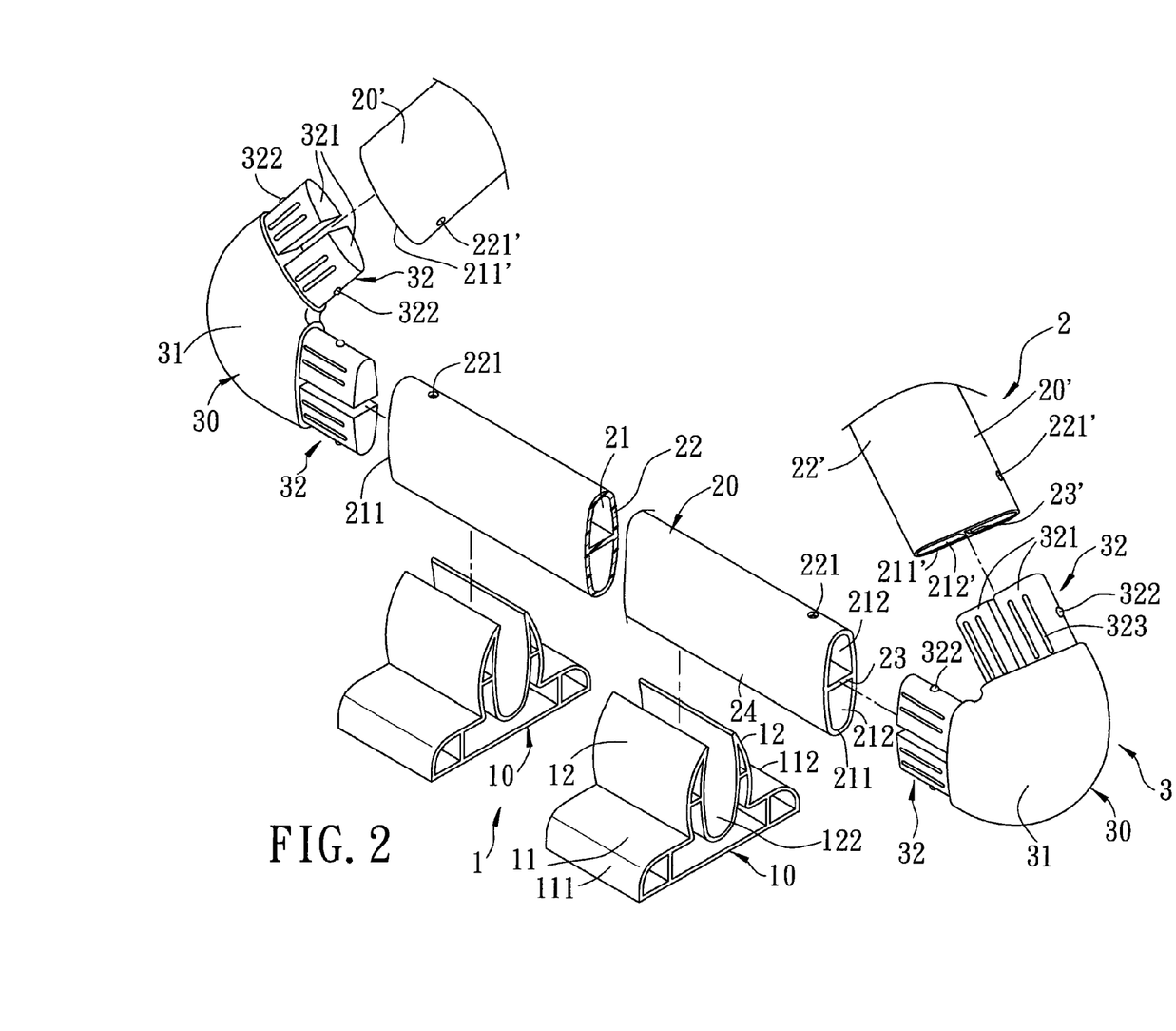
FIG. 2 is a fragmentary exploded perspective view of a portion of the first preferred embodiment.
Figure 3:
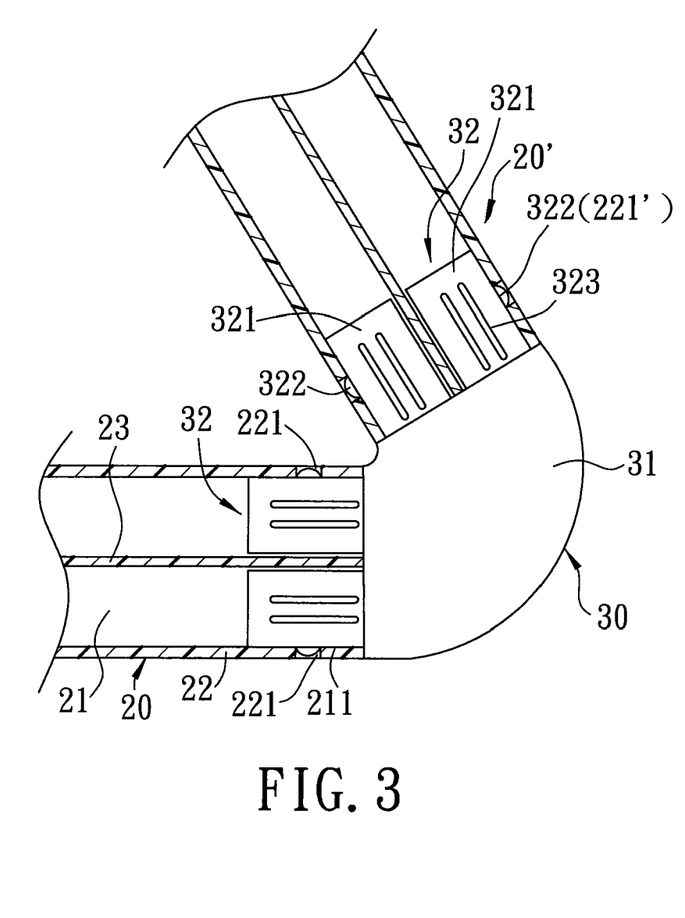
FIG. 3 is a fragmentary sectional view of the first preferred embodiment.

Referring to FIGS. 1 to 3, the first preferred embodiment of a modular educational device according to the present invention is shown to comprise a modular boundary unit 2, a connector unit 3, and a support stand unit 1, which are all made of a flexible material, such as plastic.

The modular boundary unit 2 in this embodiment includes a primary modular boundary segment 20 and two secondary modular boundary segments 20'. The primary modular boundary segment 20 has a primary outer shell 22 which extends along a primary lengthwise line (L1) to terminate at two primary socket ends 211, and which has a gripped region 24, and an elongated rib 23. The primary outer shell defines a chamber 21 extending along the primary lengthwise line (L1) to the primary socket ends 211. The elongated rib 23 is disposed in the chamber 21 to partition each of the primary socket ends 211 into two socket halves 212. Each of the primary socket ends 211 has two positioning holes 221 respectively communicated with the respective socket halves 212. Similarly, each of the secondary modular boundary segments 20' has a secondary outer shell 22' which extends along a secondary lengthwise line (L2) to terminate at two secondary socket ends 211', and an elongated rib 23'. The secondary outer shell 22' defines a chamber 21' extending along the secondary lengthwise line (L2) to the secondary socket ends 211'. The elongated rib 23' is disposed in the chamber 21' to partition each of the secondary socket ends 211' into two socket halves 212'. Each of the secondary socket ends 211' has two positioning holes 221' respectively communicated with the respective socket halves 212'. In this embodiment, each of the secondary modular boundary segments 20' has a configuration substantially the same as that of the primary modular boundary segment 20 and is a straight segment.

The connector unit 3 in this embodiment includes three modular plug-ended connectors 30. Each of the connectors 30 has a shell body 31 which has substantially the same dimension in cross section as those of the primary and secondary socket ends 211,211', and two plug ends 32 which extend from the shell body 31. In this embodiment, the plug ends 32 of each connector 30 define an included angle 33 of 120 degrees, and each of the plug ends 32 has two flexible plug halves 321 configured to be fitted snugly and respectively to the socket halves 212,212' of a respective one of the primary and secondary socket ends 211,211'. Each of the flexible plug halves 321 has a protrusion 322 disposed to be snap-fitted into the positioning hole 221,221' in a corresponding one of the primary and secondary socket halves 212,212' when fitted snugly thereto. In addition, the flexible plug halves 321 of each plug end 32 may have friction ribs 323 formed thereon to retainingly engage an interior wall of the respective one of the primary and secondary outer shells 22,22'.

The support stand unit 1 includes two modular support stands 10 with substantially the same configuration. Each support stand 10 has a base 11 which extends longitudinally along a baseline, and which further extends in a transverse direction relative to the baseline to terminate at front and rear ends 111,112, and a pair of jaws 12 which are disposed at opposite sides of the baseline, and which extend from the base 11 in an upright direction. The jaws 12 are spaced apart from each other in the transverse direction by a fitting space 122 that is configured to permit the gripped region 24 to be snugly fitted therein.

In assembly, the primary and second boundary segments 20, 20' are interconnected by fitting the plug ends 32 of each of the connectors 30 into the corresponding ones of the primary and secondary socket ends 211, 211'. After assembly, a loop-shaped structure in the form of an equilateral triangle is constructed which encircles an enclosed space 4 of a triangular shape. Finally, the support stands 10 are coupled to the primary outer shell 22 such that the primary lengthwise line (L1) is generally registered with the baselines of the bases 11 and such that the enclosed space 4 faces in the transverse direction. Thus, the loop-shaped structure can be stood on a floor surface or the like for educational or play purposes.

When it is desired to store the educational device of this invention, the protrusions 322 can be depressed to disengage from the respective positioning holes 221,221' so as to permit disengagement of the connectors 30 from the primary and secondary boundary segments 20,20'. Thus, the educational device after disassembly is relatively small in size and can be stored conveniently.

Figure 4:
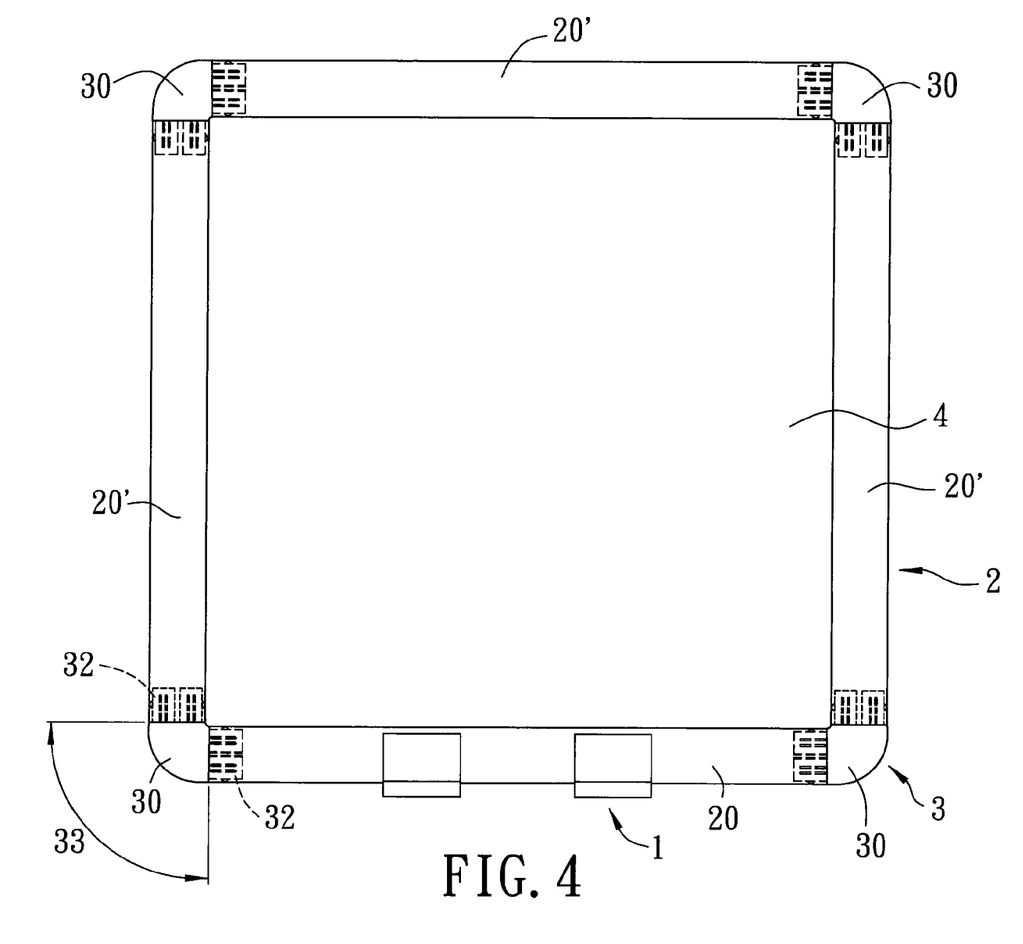
FIG. 4 is a schematic front view of the second preferred embodiment according to this invention.
Figure 5:
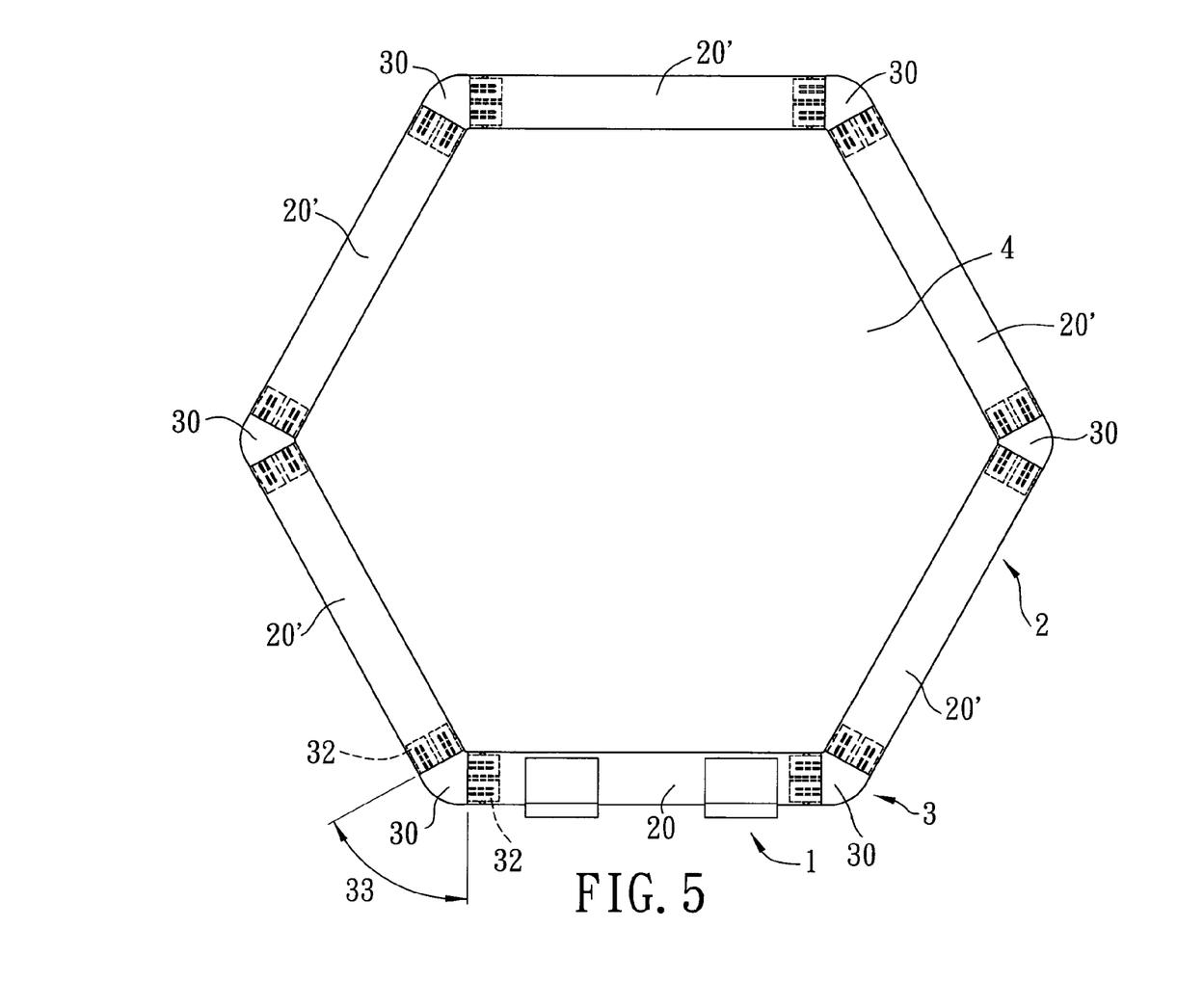
FIG. 5 is a schematic front view of the third preferred embodiment according to this invention.

In other embodiments of this invention, the connectors 30 may be modified to have different configurations. For example, referring to FIG. 4, which illustrates the second embodiment of this invention, the plug ends 32 of each of the connectors 30 define an included angle 33 of 90 degrees, and the modular boundary unit 2 includes three secondary modular boundary segments 20' which cooperate with the primary modular boundary segment 20 to form a square or rectangular structure which encircles an enclosed space 4 of a square or rectangular shape. Referring to FIG. 5, which illustrates the third embodiment of this invention, the plug ends 32 of each of the connectors 30 define an included angle 33 of 60 degrees, and the modular boundary unit 2 includes five secondary modular boundary segments 20' so as to cooperate with the primary modular boundary segment 20 to form a pentagonal structure which encircles an enclosed space 4 of a polygonal shape.

Figure 6:
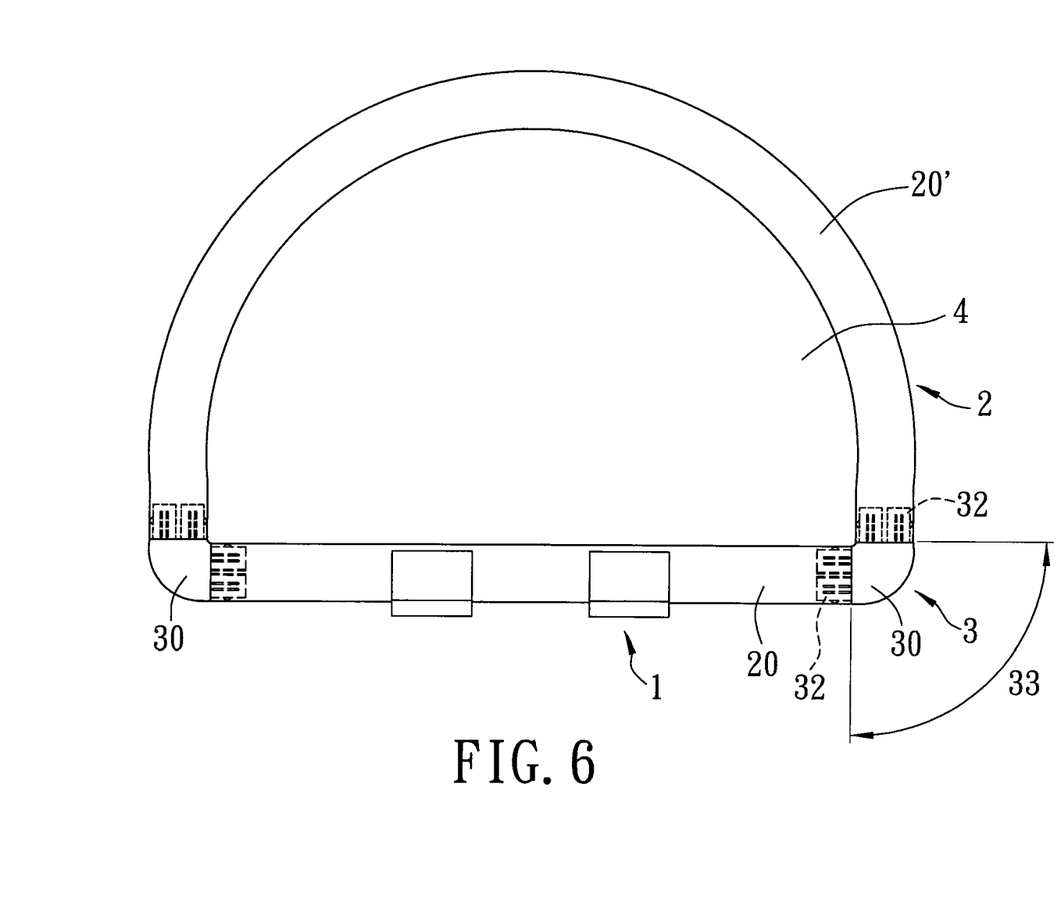
FIG. 6 is a schematic front view of the fourth preferred embodiment according to this invention.
Figure 7:
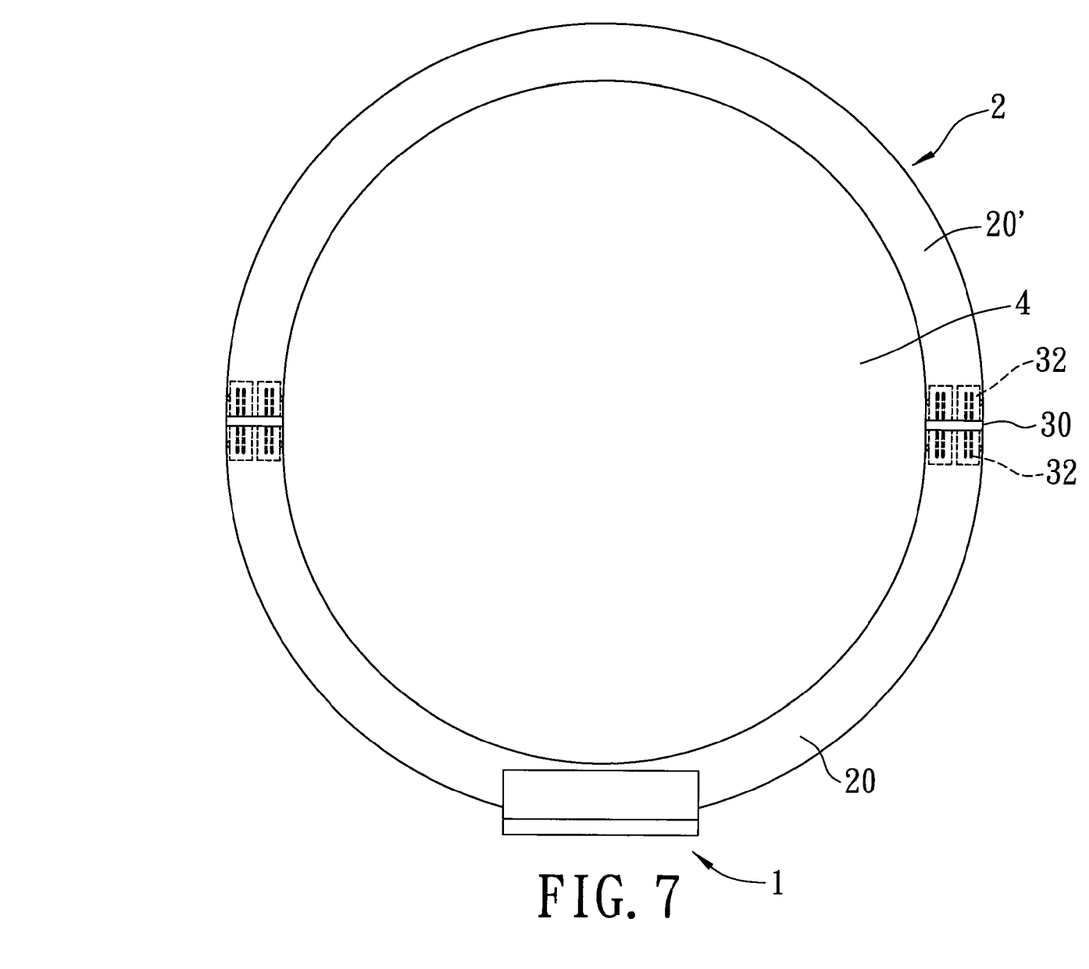
FIG. 7 is a schematic front view of the fifth preferred embodiment according to this invention.

Furthermore, the connectors 30 and one of the primary and secondary modular boundary segments 20,20' may be modified to have different configurations. For example, referring to FIG. 6, which illustrates the fourth embodiment of this invention, the plug ends 32 of each of the connectors 30 define an included angle 33 of 90 degrees, and the modular boundary unit 2 includes only one secondary modular boundary segment 20', which has a semi-circular shape and which cooperates with the primary modular boundary segment 20 to form a semi-circular structure that encircles an enclosed space 4 of a semi-circular shape. Referring to FIG. 7, which illustrates the fifth embodiment of this invention, the plug ends 32 of each of the connectors 30 are disposed opposite to each other along a lengthwise line, and the modular boundary unit 2 includes only one secondary boundary segment 20'. The primary and secondary modular boundary segments 20,20' have substantially the same configuration and the same semi-circular shape so as to form a circular structure that encircles an enclosed space 4 of a circular shape.

It is noted that the primary and secondary modular boundary segments 20,20' and the connectors 30 in the above-mentioned embodiments may be selectively combined and assembled to form various geometric shapes for educational purposes. Moreover, the primary and secondary modular boundary segments 20,20' can be easily disassembled to facilitate storage of the educational device.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A modular educational device comprising:
    a primary modular boundary segment made of a flexible material, and having a primary outer shell which extends along a primary lengthwise line to terminate at two primary socket ends, and which has a gripped region;
    at least one secondary modular boundary segment made of a flexible material, and having a secondary outer shell which extends along a secondary lengthwise line to terminate at two secondary socket ends, and which is disposed to be coupled to said primary outer shell so as to cooperate with said primary outer shell to form a loop-shaped structure that encircles an enclosed space that faces in a transverse direction relative to the primary lengthwise line;
    a plurality of modular plug-ended connectors made of a flexible material, each of said connectors having a shell body having substantially the same dimension in cross-section as that of a respective one of said primary and secondary socket ends, and two plug ends which extend from said shell body, and which are configured to mate with corresponding ones of said primary and secondary socket ends, respectively, so as to permit said secondary outer shell to be coupled to said primary outer shell; and
    a modular support stand made of a flexible material, and having a base which extends longitudinally along a baseline, and which further extends from the baseline in the transverse direction to terminate at front and rear ends, and a pair of jaws which are disposed at opposite sides of the baseline, and which extend from said base in an upright direction, said jaws being spaced apart from each other in the transverse direction by a fitting space which is configured to permit said gripped region to be snugly fitted therein so as to enable said loop-shaped structure to be stood on a surface, wherein each of said primary and secondary outer shells defines a chamber which extends along a respective one of the primary and secondary lengthwise lines to the respective ones of said primary and secondary socket ends, each of said primary and secondary modular boundary segments having an elongated rib which is disposed therein to partition each of said primary and secondary socket ends into two socket halves, each of said plug ends of said modular plug-ended connectors having two flexible plug halves which are configured to be fitted snugly and respectively to said socket halves of a respective one of said primary and secondary socket ends.

2. The modular educational device according to claim 1, wherein each of said primary and secondary socket ends has two positioning holes respectively communicated with said socket halves thereof, and each of said flexible plug halves has a protrusion which is disposed to be snap-fitted into a respective one of said positioning holes when fitted snugly to the corresponding one of said primary and secondary socket halves.

3. The modular educational device according to claim 1, wherein said secondary modular boundary segments has a configuration substantially the same as that of said primary modular boundary segment.

4. The modular education device according to claim 3, wherein said enclosed space has a geometric shape that is one of triangular, square, polygonal, and circular shapes.

5. The modular educational device according to claim 1, wherein said enclosed space has a semi-circular shape.

* * * * *